US012590674B2

(12) United States Patent
Herry et al.

(10) Patent No.: US 12,590,674 B2
(45) Date of Patent: Mar. 31, 2026

(54) THERMALLY INSULATING SEALED TANK COMPRISING A REINFORCING INSULATING PLUG

(71) Applicant: GAZTRANSPORT ET TECHNIGAZ, Saint Rémy les Chevreuse (FR)

(72) Inventors: Mickaël Herry, Saint Rémy les Chevreuse (FR); Antoine Philippe, Saint Rémy les Chevreuse (FR)

(73) Assignee: GAZTRANSPORT ET TECHNIGAZ, Saint-Rémy-lès-Chevreuse (FR)

( * ) Notice: Subject to any disclaimer, the term of this patent is extended or adjusted under 35 U.S.C. 154(b) by 1089 days.

(21) Appl. No.: 16/492,645

(22) PCT Filed: Mar. 8, 2018

(86) PCT No.: PCT/FR2018/050537
§ 371 (c)(1),
(2) Date: Sep. 10, 2019

(87) PCT Pub. No.: WO2018/167403
PCT Pub. Date: Sep. 20, 2018

(65) Prior Publication Data

US 2020/0049314 A1 Feb. 13, 2020

(30) Foreign Application Priority Data

Mar. 15, 2017 (FR) ....................................... 1752116

(51) Int. Cl.
*F17C 3/02* (2006.01)
*B67D 9/00* (2010.01)
(Continued)

(52) U.S. Cl.
CPC ................ *F17C 3/027* (2013.01); *B67D 9/00* (2013.01); *F17C 3/025* (2013.01); *F17C 3/04* (2013.01);
(Continued)

(58) Field of Classification Search
CPC .. F17C 3/025; F17C 3/027; F17C 3/04; F17C 2270/0105; F17C 2270/0107;
(Continued)

(56) References Cited

U.S. PATENT DOCUMENTS 4,747,513 A * 5/1988 Betille .................. F17C 13/126 220/560.12
10,513,316 B2 * 12/2019 Park ........................ B63B 25/16
(Continued)

FOREIGN PATENT DOCUMENTS

JP S56-150699 A 11/1981
KR 20120035952 A * 4/2012 .............. F16B 39/02
(Continued)

OTHER PUBLICATIONS

Machine English translation of KR-20160004756-A.*
(Continued)

*Primary Examiner* — John F Pettitt, III
(74) *Attorney, Agent, or Firm* — NIXON & VANDERHYE, PC

(57) ABSTRACT

A sealed and thermally insulating tank for storing fluid has a wall including a supporting structure, a primary thermal insulation barrier and a primary sealing membrane lying against the primary thermal insulation barrier, contacting the stored fluid. The primary thermal insulation barrier includes a primary insulating panel which includes a bearing zone collaborating with an anchoring device bearing against the bearing zone of the external rigid plate holding it toward the supporting structure. The primary thermal insulation barrier includes a reinforcing insulating plug extending, in the thickness direction, from the bearing zone of the external rigid plate to a specific zone of the primary sealing membrane to take up the compressive forces on the specific zone of the primary sealing membrane. The reinforcing insulating
(Continued)

plug includes a polymer foam layer having a compressive yield strength greater than that of the polymer foam layer of the primary insulating panel.

19 Claims, 5 Drawing Sheets

(51) Int. Cl.
*F17C 3/04* (2006.01)
*F17C 6/00* (2006.01)

(52) U.S. Cl.
CPC ........ *F17C 6/00* (2013.01); *F17C 2201/0157* (2013.01); *F17C 2201/052* (2013.01); *F17C 2203/0329* (2013.01); *F17C 2203/0333* (2013.01); *F17C 2203/0358* (2013.01); *F17C 2203/0631* (2013.01); *F17C 2203/0673* (2013.01); *F17C 2205/0355* (2013.01); *F17C 2221/033* (2013.01); *F17C 2227/0135* (2013.01); *F17C 2270/0105* (2013.01); *F17C 2270/0107* (2013.01)

(58) Field of Classification Search
CPC ..... F17C 2203/0673; F17C 2203/0333; B63B 25/16; B63B 17/0027
See application file for complete search history.

(56) References Cited

U.S. PATENT DOCUMENTS

| | | | | |
|---|---|---|---|---|
| 2015/0369428 | A1* | 12/2015 | Ducoup | F17D 1/082 62/53.2 |
| 2016/0076701 | A1* | 3/2016 | Philippe | B63B 3/20 220/592.25 |

FOREIGN PATENT DOCUMENTS

| | | | | | |
|---|---|---|---|---|---|
| KR | 20130083631 | A | | 7/2013 | |
| KR | 20120135494 | A | * | 12/2014 | B63B 73/43 |
| KR | 20150142032 | A | * | 12/2015 | B65D 25/16 |
| KR | 20160004756 | A | * | 1/2016 | B65D 90/06 |
| WO | WO-2013017781 | A1 | * | 2/2013 | F17C 3/027 |
| WO | WO-2013124597 | A2 | * | 8/2013 | F17C 3/027 |
| WO | WO-2016046487 | A1 | * | 3/2016 | B63B 25/08 |
| WO | 2017014426 | A1 | | 1/2017 | |

OTHER PUBLICATIONS

Machine english translation of WO-2016046487-A1.*
Machine english translation of KR-20150142032-A.*
Translation of Hwang.*
International Search Report, dated Jun. 13, 2018, from corresponding PCT application No. PCT/FR2018/050537.

* cited by examiner

THERMALLY INSULATING SEALED TANK COMPRISING A REINFORCING INSULATING PLUG

TECHNICAL FIELD

The invention relates to the field of sealed and thermally insulating membrane tanks for storing and/or transporting fluids, such as a cryogenic fluid.

Sealed and thermally insulating membrane tanks are used in particular for storing liquefied natural gas (LNG), which is stored under atmospheric pressure at approximately −162° C.

TECHNOLOGICAL BACKGROUND

The document WO16046487 describes a sealed and thermally insulating tank for storing liquefied natural gas which is integrated in the double hull of a ship. The tank comprises a multilayer structure having, in succession in the thickness direction from the exterior toward the interior of the tank, a secondary thermal insulation barrier held on a supporting structure, a secondary sealing membrane lying against the secondary thermal insulation barrier, a primary thermal insulation barrier lying against the secondary sealing membrane, and a primary sealing membrane intended to be in contact with the liquefied natural gas contained in the tank.

In the abovementioned document, the primary thermal insulation barrier comprises a plurality of primary insulating panels which are anchored on studs fixed to the secondary insulating panels of the secondary thermal insulation barrier. The primary insulating panels comprise a layer of polymer foam sandwiched between an external plate and an internal plate made of wood veneer. Each primary insulating panel comprises a plurality of cut-outs along its longitudinal edges and its corners in such a way that the external plate of the secondary insulating panels protrudes. The external plate of the primary insulating panels thus forms, at each of the cut-outs, a bearing surface which cooperates with a retention member, fixed to one of the studs, in such a way as to hold the primary panels toward the supporting structure. Moreover, the primary thermal insulation barrier comprises a plurality of closure plates allowing the bearing surface of the primary sealing membrane to be filled in at the cut-outs. The closure plates are positioned in counterbores which are formed on the internal plate of the primary insulating panels. The primary sealing membrane comprises series of perpendicular corrugations which allow it to deform under the effect of the thermal and mechanical stresses generated by the fluid stored in the tank.

In such a tank integrated into the supporting structure of a ship, swell movements to which the ship is subjected have the effect of agitating the liquefied natural gas stored in the tank. This agitation creates movements of the liquefied natural gas against the walls of the tank which generate dynamic pressure surges that are likely to degrade the primary sealing membrane, especially if the latter is not correctly supported by the primary thermal insulation barrier.

SUMMARY

One idea on which the invention is based is to provide a sealed and thermally insulating tank for storing a fluid which offers excellent resistance to pressure surges likely to be caused by movement of the fluid inside the tank.

According to one mode of embodiment, the invention provides a sealed and thermally insulating tank for storing a fluid having a wall comprising, in a thickness direction from the exterior toward the interior of the tank, a supporting structure, a primary thermal insulation barrier and a primary sealing membrane which lies against the primary thermal insulation barrier and is intended to be in contact with the fluid stored in the tank;

the primary thermal insulation barrier comprising a primary insulating panel including an external rigid plate and a polymer foam layer which is fixed on the external rigid plate and is disposed between the external rigid plate and the primary sealing membrane, the polymer foam layer having a recess which extends through the whole thickness of the polymer foam layer and which forms, at the external rigid plate, a bearing zone, the bearing zone of the external rigid plate collaborating with an anchoring device, the anchoring device bearing against the bearing zone of the external rigid plate in such a way as to hold it toward the supporting structure, the primary sealing membrane comprising a specific zone which is disposed plumb with the bearing zone and which comprises a portion projecting toward the interior or toward the exterior of the tank;

the primary thermal insulation barrier comprising a reinforcing insulating plug which is housed in the recess of the polymer foam layer in such a way as to ensure continuity of thermal insulation of the primary thermal insulation barrier, said reinforcing insulating plug extending, in the thickness direction, from the bearing zone of the external rigid plate to the specific zone of the primary sealing membrane in such a way as to take up the compressive forces that might act on the specific zone of the primary sealing membrane.

According to a mode of embodiment, the reinforcing insulating plug comprises a polymer foam layer having a compressive yield strength equal to or greater than 80% of that of the polymer foam layer of the primary insulating panel.

According to a mode of embodiment, the reinforcing insulating plug has a structural function of taking up the compressive loads which act on the specific zone of the sealing membrane.

According to a mode of embodiment, the reinforcing insulating plug has a polymer foam layer.

Such a tank is advantageous in that the primary thermally insulating barrier is reinforced at a particularly critical zone, namely in an anchoring zone of a primary insulating panel, facing a specific zone of the primary sealing membrane which, because of its portion projecting toward the interior or toward the exterior of the tank, is especially sensitive to pressure surges generated by movement of the fluid in the tank.

Furthermore, the anchoring device according to the invention bears against the rigid external plate which is subjected to a lesser extent to the phenomena of creep and crushing than a polymer foam, which makes it possible to ensure satisfactory anchoring of the primary insulating panel.

According to other advantageous modes of embodiment, such a tank may have one or more of the following features.

According to a mode of embodiment, the polymer foam layer of the reinforcing insulating plug has a yield strength greater than that of the polymer foam layer of the primary insulating panel. Since the primary thermally insulating barrier is thus locally reinforced by the presence of the reinforcing insulating plug, the mechanical characteristics of the polymer foam layer of the primary insulating panel are less critical, which allows said primary insulating panel to have better thermal insulation characteristics and/or to be less costly.

According to a mode of embodiment, the polymer foam layer of the reinforcing insulating plug is equal to or greater than 1 MPa, typically between 1 MPa and 4 MPa, for example of the order of 1.3 MPa.

According to a mode of embodiment, the polymer foam layer of the primary insulating panel is equal to or greater than 1 MPa, typically between 1 MPa and 4 MPa, for example of the order of 1.3 MPa.

According to a mode of embodiment, the compressive yield strength of the polymer foam of the reinforcing insulating plug and the compressive yield strength of the polymer foam layer of the primary insulating panel are measured in the thickness direction of the tank.

According to a mode of embodiment, the specific zone of the primary sealing membrane is a node zone formed at the intersection between two corrugations of the primary sealing membrane.

According to a mode of embodiment, the primary sealing membrane is a corrugated membrane comprising at least two corrugations projecting toward the interior or the exterior of the tank which intersect at a node zone, said node zone comprising a base bearing against the reinforcing insulating plug.

According to a mode of embodiment, the polymer foam layer of the reinforcing insulating plug has a density equal to or greater than the density of the polymer foam layer of the primary insulating panel.

According to a mode of embodiment, the density of the polymer foam layer of the reinforcing insulating plug is more than 1.2 times greater than the density of the polymer foam layer of the primary insulating panel.

According to a mode of embodiment, the polymer foam layer of the primary insulating panel has a density of between 110 and 150 kg/m$^3$.

According to a mode of embodiment, the polymer foam layer of the primary insulating panel is made of polyurethane foam.

According to a mode of embodiment, the polymer foam layer of the reinforcing insulating plug has a density of between 180 and 240 kg/m$^3$.

According to a mode of embodiment, the polymer foam layer of the reinforcing insulating plug is made of polyurethane foam.

According to a mode of embodiment, the polymer foam layer of the reinforcing insulating plug is reinforced by fibers, such as glass fibers. According to an advantageous variant, the fibers are oriented in the thickness direction of the wall.

According to a mode of embodiment, the reinforcing insulating plug is housed in the recess between the anchoring device and the primary sealing membrane.

According to a mode of embodiment, the primary thermal insulation barrier comprises two adjacent primary insulating panels each including an external rigid plate and a polymer foam layer which is fixed on the external rigid plate and is disposed between the external rigid plate and the primary sealing membrane, the polymer foam layer of each of the primary insulating panels having a recess which extends through the whole thickness of the polymer foam layer and is formed at the edge of said primary insulating panel in such a way that the external rigid plate of each of the primary insulating panels has a bearing zone which protrudes from the polymer foam layer, the respective recesses of the two primary insulating panels being disposed in such a way as to open one into the other, the anchoring device being arranged to hold the bearing zone of the external rigid plate of one and the other of the two primary insulating panels toward the supporting structure.

According to a mode of embodiment, the primary thermal insulation barrier comprises three primary insulating panels each including an external rigid plate and a polymer foam layer which is fixed on the external rigid plate and is disposed between the external rigid plate and the primary sealing membrane, the polymer foam layer of each of the primary insulating panels having a recess which extends through the whole thickness of the polymer foam layer and is formed at the edge of said primary insulating panel in such a way that the external rigid plate of each of the primary insulating panels has a bearing zone which protrudes from the polymer foam layer, the respective recesses of the two primary insulating panels being disposed in such a way as to open one into the other, the anchoring device being arranged to hold the bearing zone of the external rigid plate of one and the other of the two primary insulating panels toward the supporting structure. According to a variant, the housing formed by the three recesses has a Y shape.

According to a mode of embodiment, the primary thermal insulation barrier comprises four primary insulating panels, each of the primary insulating panels comprising a corner adjacent to a corner of the three other primary insulating panels, each primary insulating panel including an external rigid plate and a polymer foam layer which is fixed on the external rigid plate and is disposed between the external rigid plate and the primary sealing membrane, the polymer foam layer of each of the primary insulating panels having a recess which extends through the whole thickness of the polymer foam layer at said corner in such a way that the external rigid plate of each of the primary insulating panels has a bearing zone which protrudes from the polymer foam layer, the respective recesses of the four primary insulating panels being disposed in such a way as to open one into the others and to form a housing, the anchoring device being disposed in the housing and arranged to hold the bearing zone of the external rigid plate of each of the four primary insulating panels toward the supporting structure.

According to a mode of embodiment, the housing formed by the four recesses has the shape of a cross.

According to a mode of embodiment, the primary sealing membrane is a corrugated membrane including at least two corrugations projecting toward the interior or the exterior of the tank which intersect at a node zone, the node zone comprising four bases lying against the primary thermal insulation barrier which are each disposed plumb with the bearing zone of one of the four primary insulating panels.

According to a first variant embodiment, the primary thermal insulation barrier comprises four reinforcing insulating plugs which are each housed in one of the recesses of the four respective primary insulating panels and an insulating block which is disposed in the center of the housing between the four reinforcing insulating plugs in such a way as to maintain the four reinforcing insulating plugs in position, each of the reinforcing insulating plugs extending, in the thickness direction, from the bearing zone of the external rigid plate of one of the primary insulating panels to the specific zone of the primary sealing membrane; each reinforcing insulating plug comprising a polymer foam layer having a compressive yield strength greater than that of the polymer foam layer of the primary insulating panel.

According to a mode of embodiment, each of the four bases of the node zone lies against one of the four reinforcing insulating plugs.

According to a second variant embodiment, the reinforcing insulating plug has a shape which is complementary to the shape of the housing.

According to a mode of embodiment, the anchoring device comprises a retention member having a tab bearing against each bearing zone and a stud fixed directly or indirectly to the supporting structure, the retention member being fixed on the stud.

According to a mode of embodiment, the tab of the retention member is disposed between the bearing zone and the reinforcing insulating plug.

According to a mode of embodiment, the retention member is fixed on the stud by means of a nut.

According to a mode of embodiment, the anchoring device comprises one or more elastic washers, such as Belleville washers for example, threaded onto the threaded stud between the nut and the retention member. This makes it possible to ensure elastic anchoring of the primary insulating panels.

According to a mode of embodiment, the or each primary insulating panel comprises an internal rigid plate fixed to the polymer foam layer and disposed between the insulating polymer foam layer and the primary sealing membrane.

According to a mode of embodiment, the internal rigid plate has a recess in the extension of the recess formed through the whole thickness of the polymer foam layer.

According to a mode of embodiment, the or each reinforcing insulating plug comprises an external rigid plate flush with the external rigid plate of the primary insulating panel.

According to a mode of embodiment, the or each reinforcing insulating plug comprises an external rigid plate flush with the internal rigid plate of the primary insulating panel.

According to a mode of embodiment, the secondary thermal insulation barrier comprises a secondary insulating panel anchored to the supporting structure, the anchoring device being fixed on the secondary insulating panel and thus ensuring anchoring of the primary insulating panel(s) on the secondary insulating panel.

According to another mode of embodiment, the invention provides a sealed and thermally insulating tank for storing a fluid having a wall comprising, in a thickness direction from the exterior toward the interior of the tank, a supporting structure, a primary thermal insulation barrier and a primary sealing membrane which lies against the primary thermal insulation barrier and is intended to be in contact with the fluid stored in the tank;

the primary thermal insulation barrier comprising an insulating element including an external rigid plate and an insulating filling associated with the external rigid plate and disposed between the external rigid plate and the primary sealing membrane, the insulating element having a recess which extends through the whole thickness of the insulating filling and which forms, at the external rigid plate, a bearing zone, the bearing zone of the external rigid plate collaborating with an anchoring device, the anchoring device bearing against the bearing zone of the external rigid plate in such a way as to hold it toward the supporting structure, the primary sealing membrane comprising a specific zone which is disposed plumb with the bearing zone;

the primary thermal insulation barrier comprising a reinforcing insulating plug which is housed in the recess in such a way as to ensure continuity of thermal insulation of the primary thermal insulation barrier, said reinforcing insulating plug extending, in the thickness direction, from the bearing zone of the external rigid plate to the specific zone of the primary sealing membrane in such a way as to take up the compressive forces that might act on the specific zone of the primary sealing membrane, the reinforcing insulating plug having a structural function of taking up the compressive loads which act on the specific zone of the primary sealing membrane.

According to a mode of embodiment, the wall of the tank comprises only one primary thermal insulation barrier and only one primary sealing membrane. According to another mode of embodiment, the wall of the tank further comprises a secondary thermal insulation barrier and a secondary sealing membrane.

According to a mode of embodiment, the specific zone of the primary sealing membrane comprises a portion projecting toward the interior or toward the exterior of the tank.

According to a mode of embodiment, the insulating element is a primary insulating panel and the lagging filling is a polymer foam layer. According to another mode of embodiment, the insulating element is a box structure comprising the external rigid plate, an internal rigid plate and spacers extending in the thickness direction of the tank between the internal rigid plate and the external rigid plate, the lagging filling being housed in compartments formed between the spacers. In such a mode of embodiment, the lagging filling is chosen from among materials such as perlite, glass wool, polyurethane foam, polyethylene foam, polyvinyl chloride foam, aerogels or the like.

According to another mode of embodiment, the invention also provides a sealed and thermally insulating tank for storing a fluid having a wall comprising, in a thickness direction from the exterior toward the interior of the tank, a supporting structure, a primary thermal insulation barrier and a primary sealing membrane which lies against the primary thermal insulation barrier and is intended to be in contact with the fluid stored in the tank;

the primary thermal insulation barrier comprising four primary insulating panels, each of the primary insulating panels comprising a corner adjacent to a corner of the three other primary insulating panels, each primary insulating panel including an external rigid plate and a polymer foam layer which is fixed on the external rigid plate and is disposed between the external rigid plate and the primary sealing membrane, the polymer foam layer of each of the primary insulating panels having a recess which extends through the whole thickness of the polymer foam at said corner in such a way that the external rigid plate of each of the insulating panels has a bearing zone which protrudes from the polymer foam layer, the respective recesses of the four primary insulating panels being disposed in such a way as to open one into the others and to form a housing, an anchoring device being arranged to hold the bearing zone of the external rigid plate of each of the four primary insulating panels toward the supporting structure;

the primary thermal insulation barrier comprising four insulating plugs which are each housed in one of the recesses of the four respective primary insulating panels and a central insulating block which is disposed in the center of the housing between the four reinforcing insulating plugs in such a way as to maintain the four reinforcing insulating plugs in position, each reinforcing insulating plug extending, in the thickness direction, from one of the bearing zones to the primary sealing membrane in such a way as to take up the compressive forces that might act on the primary sealing membrane.

Such a tank is particularly advantageous in that the insulating plugs make it possible for the primary sealing membrane to be supported effectively and make it possible to avoid the presence of counterbores formed in the primary insulating panels and able to receive closure plates.

A tank according to one of the modes of embodiment described above may form part of an onshore storage facility, for example for storing LNG, or may be installed in an inshore or deep-water floating structure, notably an ethane or methane tanker, a floating storage and regasification unit (FSRU), a floating production storage and offloading (FPSO) unit, or the like. In the case of a floating structure, the tank may be intended to receive liquefied natural gas used as a fuel for the propulsion of the floating structure.

According to a mode of embodiment, a ship for transporting a fluid comprises a hull, such as a double hull, and an abovementioned tank disposed in the hull.

According to a mode of embodiment, the invention also provides a method for loading or offloading such a ship, in which method a fluid is conveyed through insulated pipelines from or to a floating or onshore storage facility to or from the tank of the ship.

According to a mode of embodiment, the invention also provides a system for transferring a fluid, the system comprising the abovementioned ship, insulated pipelines arranged in such a way as to connect the tank installed in the hull of the ship to a floating or onshore storage facility and a pump for causing a stream of fluid to flow through the insulated pipelines from or to the floating or onshore storage facility to or from the tank of the ship.

BRIEF DESCRIPTION OF THE FIGURES

The invention will be better understood, and other objects, details, features and advantages thereof will become more clearly apparent during the course of the following description of a number of particular modes of embodiment of the invention which are given solely by way of nonlimiting illustration with reference to the appended drawings.

DETAILED DESCRIPTION OF MODES OF EMBODIMENT

By convention, the terms "external" and "internal" are used to define the relative position of one element with respect to another, with reference to the interior and the exterior of the tank.

Figure 1:
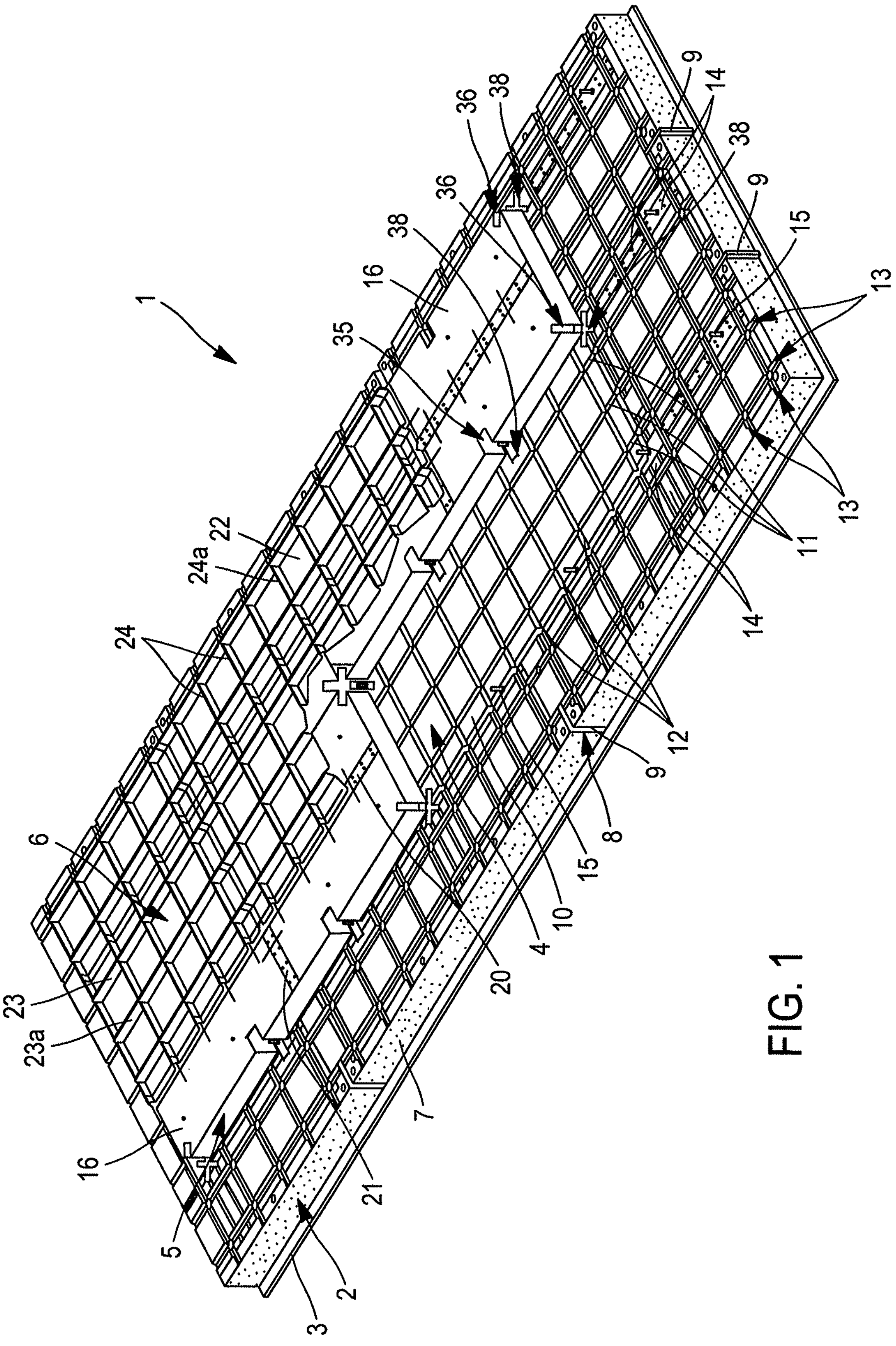
FIG. 1 is a cutaway perspective view of a wall of a tank.

FIG. 1 shows the multilayer structure of a wall 1 of a sealed and thermally insulating tank for storing a fluid, such as liquefied natural gas (LNG). Each wall 1 of the tank comprises in succession, in the thickness direction, from the exterior toward the interior of the tank, a secondary thermal insulation barrier 2 held on the supporting structure 3, a secondary sealing membrane 4 lying against the secondary thermal insulation barrier 2, a primary thermal insulation barrier 5 lying against the secondary sealing membrane 4 and a primary sealing membrane 6 intended to be in contact with the liquefied natural gas contained in the tank.

The supporting structure 3 may notably comprise self-supporting metal sheets or, more generally, any type of rigid partitions having suitable mechanical properties. The supporting structure 3 may in particular be formed by the hull or the double hull of a ship. The supporting structure 3 comprises a plurality of walls defining the general shape of the tank which is usually a polyhedral shape.

The secondary thermal insulation barrier 2 comprises a plurality of secondary insulating panels 7 anchored to the supporting structure by means of resin beads, not depicted, and/or studs, not depicted, welded on the supporting structure 3. The secondary insulating panels 7 have a substantially rectangular parallelepiped shape and are placed alongside each other in parallel rows separated from one another by gaps 8 ensuring a functional mounting clearance. The gaps 8 are filled with a lagging filling 9 such as glass wool, rock wool or flexible open-cell synthetic foam, for example. The secondary insulating panels 7 each comprise an insulating polymer foam layer sandwiched between an internal rigid plate and an external rigid plate. The internal and external rigid plates are, for example, plates of wood veneer bonded on said insulating polymer foam layer. The insulating polymer foam may in particular be a polyurethane-based foam.

The secondary sealing membrane 4 comprises a plurality of corrugated metal sheets 10 each having a substantially rectangular shape. The corrugated metal sheets 10 are disposed at an offset to the secondary insulating panels 7 of the secondary thermal insulation barrier 2 in such a way that each of said corrugated metal sheets 10 extends simultaneously over four adjacent secondary insulating panels 7.

Each corrugated metal sheet 10 has a first series of parallel corrugations 11 extending in a first direction and a second series of parallel corrugations 12 extending in a second direction. The directions of the series of corrugations 11, 12 are perpendicular to one another. Each of the series of corrugations 11, 12 is parallel to two opposing edges of the corrugated metal sheets 10. The corrugations project toward the exterior of the tank, i.e., in the direction of the supporting structure 3. The corrugations of the corrugated metal sheets 10 are housed in grooves 13 formed in the internal plate of the secondary insulating panels 7.

The adjacent corrugated metal sheets 10 are lap-welded together. Furthermore, the corrugated metal sheets 10 are welded onto metal mounting plates 14 which are fixed on the internal plate of the secondary insulating panels 7. The corrugated metal sheets 10 comprise, along their longitudinal edges and at their four corners, cut-outs allowing the passage of studs 15 which are fixed on the internal rigid plates of the secondary insulating panels 7 and which are intended to ensure fixing of the primary thermal insulation barrier 5 on the secondary thermal insulation barrier 2. The corrugated metal sheets 10 are, for example, made from Invar®: i.e., an alloy of iron and nickel with a coefficient of expansion typically between $1.2\cdot10^{-6}$ and $2\cdot10^{-6}$ $K^{-1}$, or from an iron alloy with a high manganese content with a coefficient of expansion typically of the order of $7\cdot10^{-6}$ $K^{-1}$.

Moreover, the primary thermal insulation barrier 5 comprises a plurality of primary insulating panels 16 having a substantially rectangular parallelepiped shape. The primary insulating panels 16 are offset here with respect to the secondary insulating panels 7 of the secondary thermal insulation barrier 2 in such a way that each primary insulating panel 16 extends over four secondary insulating panels 7.

Figure 2:
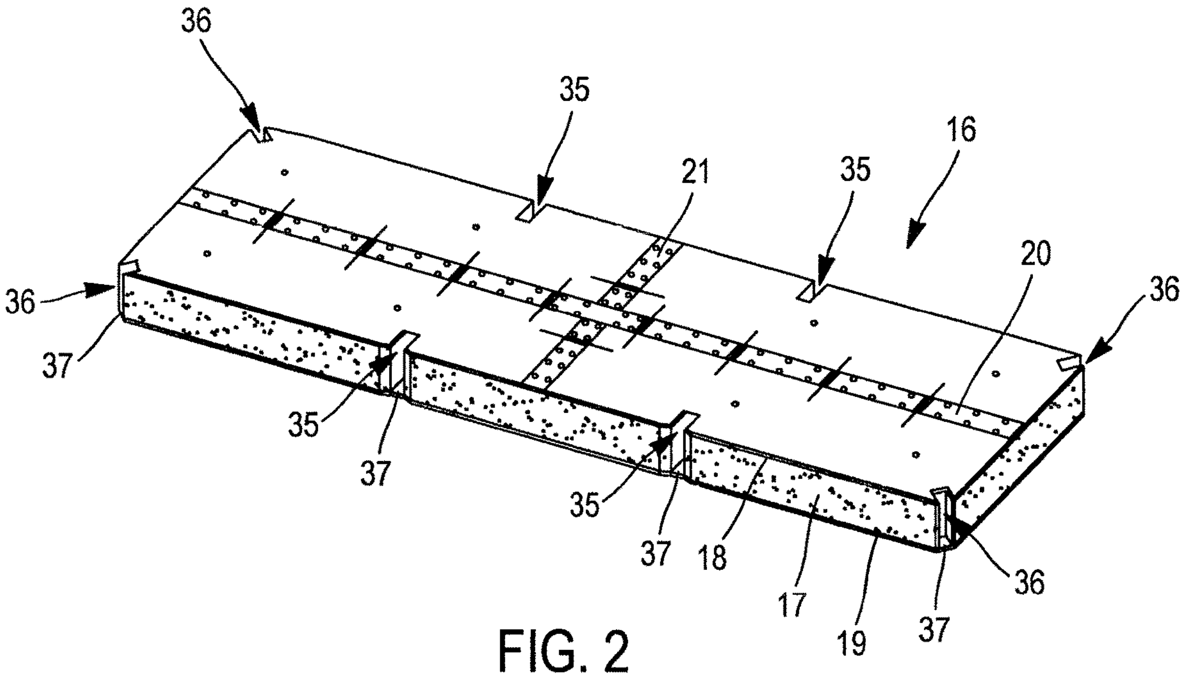
FIG. 2 is a perspective view of a primary insulating panel of the wall of the tank in FIG. 1.

A primary insulating panel 16 is shown in detail in FIG. 2. Each secondary insulating panel 16 has a polymer foam layer 17 sandwiched between two rigid plates, namely an external rigid plate 19 and an internal rigid plate 18. The external 19 and internal 18 rigid plates are made of wood veneer for example. Alternatively, the external 19 and internal 18 rigid plates are made of a plastic material, such as polyvinyl chloride (PVC), polyethylene terephthalate (PET), polyethylene (PE), acrylonitrile-butadiene-styrene (ABS) copolymer, polyurethane (PU) or polypropylene 25 (PP), optionally reinforced by fibers.

The polymer foam layer 17 is for example polyurethane foam, optionally reinforced by fibers, such as glass fibers. The polyurethane foam has a density of between 110 and 150 $kg/m^3$, for example of the order of 130 $kg/m^3$. Alternatively, the polymer foam layer is polyethylene foam or polyvinyl chloride foam. In other modes of embodiment, the polyurethane foam has a high density, i.e., a density of between 170 and 210 $kg/m^3$. The internal rigid plate 18 of each primary insulating panel 16 is provided with metal mounting plates 20, 21 for anchoring the corrugated metal sheets 22 of the primary sealing membrane 6. The metal mounting plates 20, 21 extend in two perpendicular directions which are each parallel to two opposing edges of the primary insulating panels. In the mode of embodiment depicted, the metal mounting plates 20 are disposed along the longitudinal axis of symmetry of the primary insulating panels 16 and the metal mounting plates 21 are disposed along the transverse axis of symmetry of the primary insulating panels 16. The metal mounting plates 20, 21 are fixed in counterbores formed in the internal rigid plate 18 of the primary insulating panel 16 and fixed to the latter by screws, rivets or clasps, for example.

Figure 3:
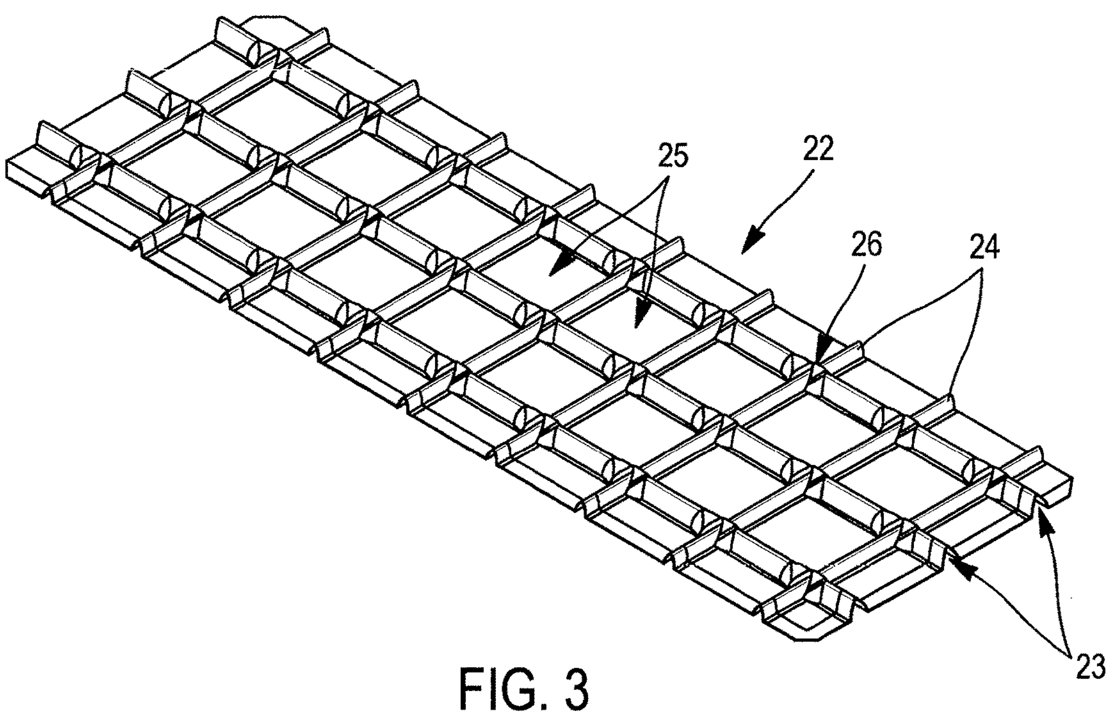
FIG. 3 is a perspective view of a corrugated metal sheet of the primary sealing membrane.

The primary sealing membrane 6 is obtained by assembling a plurality of corrugated metal sheets 22, one of which is shown in FIG. 3. The corrugated metal sheets 22 are, for example, made from stainless steel, aluminum, Invar®: i.e., an alloy of iron and nickel (such as Fe-36Ni) with a coefficient of expansion typically between $1.2\cdot10^{-6}$ and $2\cdot10^{-6}$ $K^{-1}$, or from an iron alloy with a high manganese content with a coefficient of expansion of the order of $7\cdot10^{-6}$ $K^{-1}$. The corrugated metal sheets 22 each have a substantially rectangular shape. Each corrugated metal sheet 22 comprises a first series of parallel corrugations 23 extending in a first direction and a second series of parallel corrugations 24 extending in a second direction perpendicular to the first series. Each of the series of corrugations 23, 24 is parallel to two opposing edges of the corrugated metal sheet 22 and to two opposing edges of the primary insulating panels 16. The corrugations project toward the interior of the tank.

Figure 4:
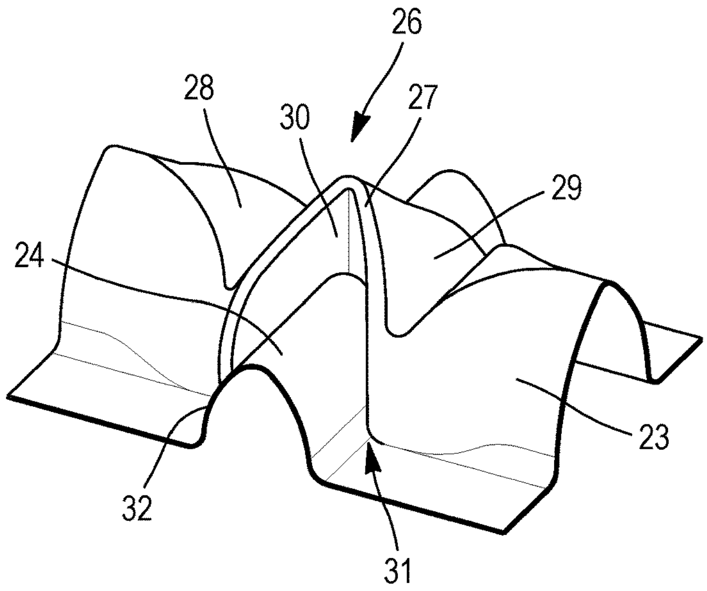
FIG. 4 is a detail view of a node zone of the corrugated metal sheet in FIG. 3.

Each corrugated metal sheet 22 comprises, between the corrugations, a plurality of planar surfaces 25 bearing against the internal plates 18 of the primary insulating panels 16. At each intersection between two corrugations 22, 23, the metal sheet comprises a node zone 26, as shown in FIG. 4. The node zone 26 comprises a central portion 27 having a peak projecting toward the interior of the tank. Moreover, the central portion 27 is bounded, on the one hand, by a pair of concave corrugations 28, 29 formed in the crest of the higher corrugation 23 and, on the other hand, by a pair of indentations 30 penetrated by the lower corrugation. The node zone 26 further comprises four bases 31, 32 only two of which are visible in FIG. 4. The four bases 31, 32 are each disposed at the junction between the node zone and the adjacent corner zone of one of the four planar surfaces 25 adjoining said node zone 26. The node zone 26 bears against the primary thermally insulating barrier 5 at said bases 31, 32. The compressive forces that might act on the node zone 26 are thus transmitted to the primary thermally insulating barrier 5 at said bases 31, 32.

Returning to FIG. 1, it will be noted that the corrugated metal sheets 22 of the primary sealing membrane 6 are disposed at an offset to the primary insulating panels 16 in such a way that each of said corrugated metal sheets 22 extends simultaneously over four adjacent primary insulating panels 16. The corrugated metal sheets 22 are lap-welded together and are furthermore welded along their edges onto the metal mounting plates 20, 21 which are fixed on the primary insulating panels 16.

As shown in FIG. 1, the corrugated metal sheets 22 are disposed in such a way that one corrugation 23*a* extends facing each gap, oriented in the longitudinal direction of the primary insulating panels 16, between two adjacent primary insulating panels 16 and that one corrugation 24*a* extends facing each gap, oriented transversely, between two adjacent primary insulating panels 16. One node zone 26 of the primary sealing membrane 6 is therefore located facing each intersection between two gaps separating primary insulating panels 16.

Figure 5:
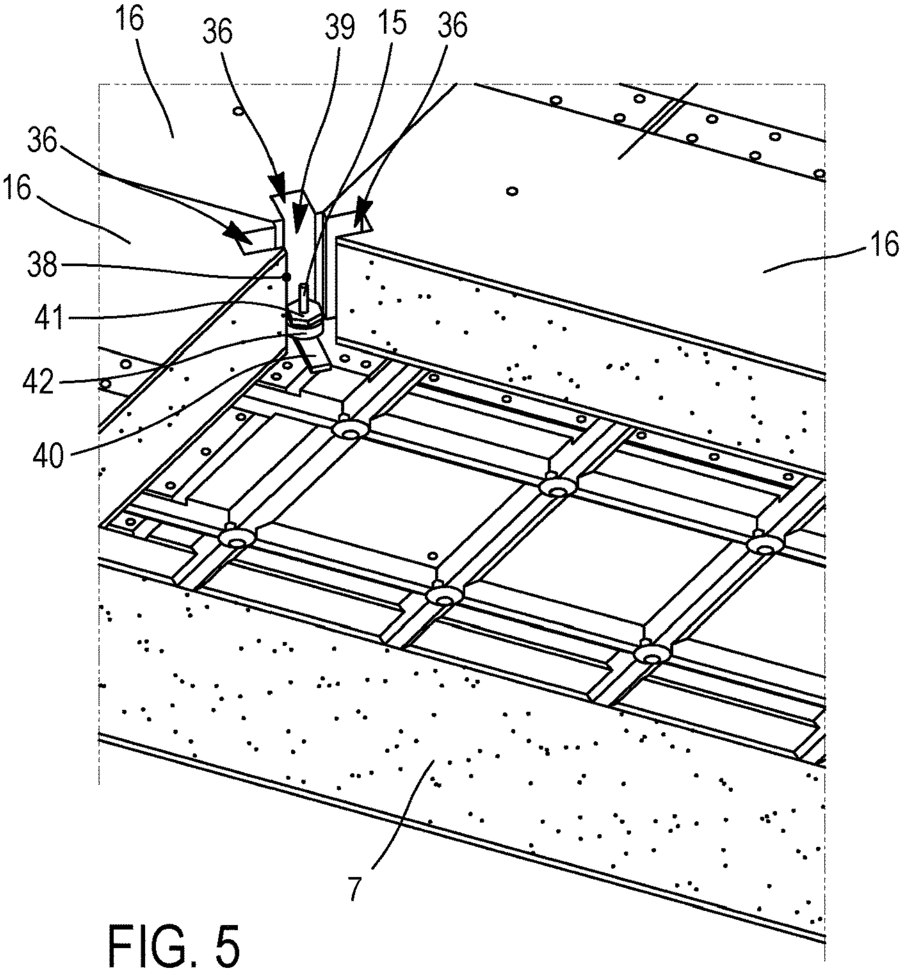
FIG. 5 is a perspective view illustrating an anchoring device allowing primary insulating panels of the primary thermal insulation barrier to be fixed on the secondary thermal insulation barrier.

As shown in FIGS. 1, 2 and 5, each primary insulating panel 16 comprises one or more recesses 35 along each of its two longitudinal edges and a recess 36 at each of its corners. Each recess 35, 36 runs across the internal rigid plate 18 and extends through the whole thickness of the polymer foam layer 17. At each of the recesses 35, 36, the external rigid plate 19 protrudes with respect to the polymer foam layer 17 and to the internal rigid plate 18 in such a way as to form a bearing zone 37 collaborating with an anchoring device 38. Each recess 35 formed in the edge of one of the primary insulating panels 16 is disposed facing a recess 35 formed in the opposite edge of an adjacent primary insulating panel 16. A single anchoring device 38 may thus collaborate with two bearing zones 37 belonging respectively to one and the other of the two adjacent primary insulating panels 16. Furthermore, as shown in FIG. 5, each recess 36 formed at one of the corners of the primary insulating panels 16 opens opposite the recesses 36 formed at the adjacent corners of the three adjacent primary insulating panels 16. The four recesses 36 thus together form a housing 39 in the shape of a cross. A single anchoring device 38 may therefore collaborate with the four bearing zones 37 of the four adjacent primary insulating panels 16.

Figure 8:
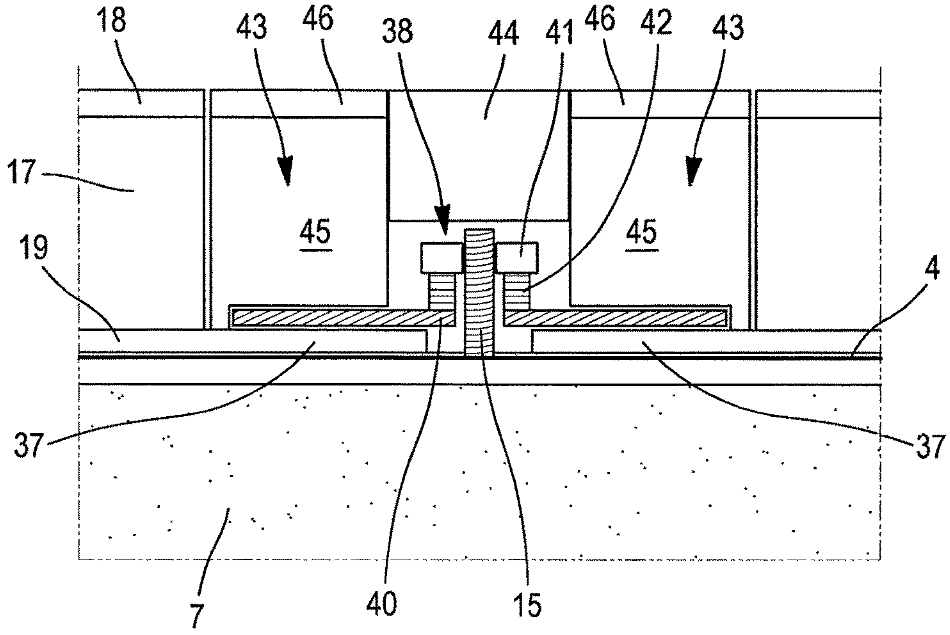
FIG. 8 is a view in cross section of the thermal insulation barrier at an anchoring device.

As shown in FIGS. 5 and 8, each anchoring device 38 collaborates with a stud 15 fixed on the external rigid plate of the secondary insulating panels 7. To achieve this, each anchoring device 38 comprises a retention member 40 fixed on one of the studs 15. Each retention member 40 comprises tabs which are each housed in the interior of one of the recesses 36. At the corners of the primary insulating panels 16, the retention member 40 thus has an x shape including four tabs which are each housed in the interior of a recess 36 of one of the four adjacent primary insulating panels 16. At the longitudinal edges of the primary insulating panels 16, the retention member has a substantially rectilinear shape.

Each tab of the retention member 40 bears against one of the bearing zones 37, i.e., the portion of the external plate 19 protruding with respect to the external plate 18 and to the polymer foam layer 17, in such a way that each bearing zone 37 is sandwiched between one of the tabs of the retention member 40 and the secondary sealing membrane 4 which lies against the secondary thermal insulation barrier 2.

The retention member 40 comprises a bore threaded onto the stud 15. A nut 41 collaborates with a thread of the stud 15 in such a way as to ensure fixing of the retention member 40 on the stud 15. Furthermore, in the mode of embodiment depicted, one or more elastic washers, such as Belleville washers 42, are threaded onto the stud 15, between the nut 41 and the retention member 40, which makes it possible to ensure elastic anchoring of the primary insulating panels 16 on the secondary insulating panels 7.

Figure 6:
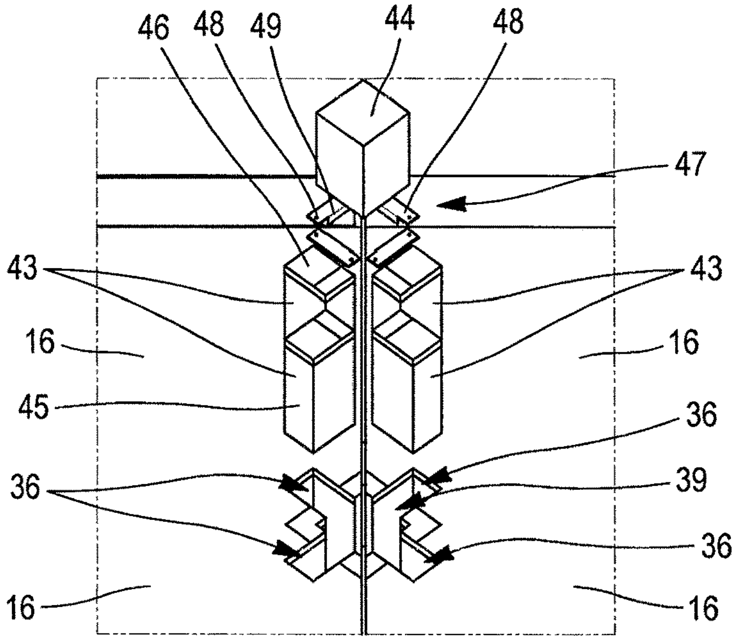
FIG. 6 is a perspective view of four adjacent primary insulating panels and of four reinforcing insulating plugs which are each intended to be disposed in a recess of one of the four primary insulating panels, at the junction between said primary insulating panels.
Figure 7:
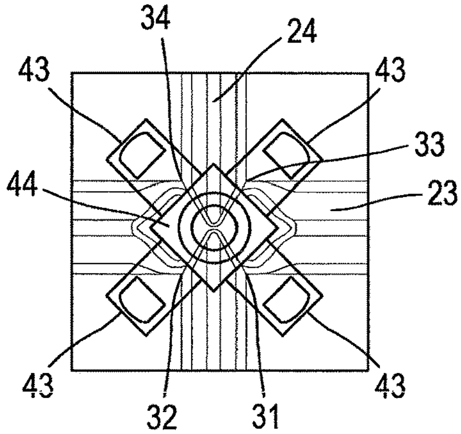
FIG. 7 is a plan view of the primary sealing membrane at a node zone positioned at the junction between the corners of the four adjacent primary insulating panels, the primary sealing membrane being depicted as transparent in such a way as to enable the primary thermal insulation barrier to be seen.

The structure of the primary thermal insulation barrier 5 at one anchoring device 38 acting on the corners of four adjacent primary insulating panels 16 can be seen with reference to FIGS. 6, 7 and 8. The primary thermal insulation barrier 5 comprises four reinforcing insulating plugs 43 which are each housed in the recess 37 of one of the primary insulating panels 16 in such a way as to ensure continuity of thermal insulation. The reinforcing insulating plugs 43 each have a shape substantially complementary to that of one of the recesses 37. The primary thermal insulation barrier 5 also comprises an insulating block 44 which is disposed in the center of the housing 39 between the four reinforcing insulating plugs 43. The insulating block 44 thus allows said reinforcing insulating plugs 43 to be maintained in position while also ensuring continuity of thermal insulation.

Each reinforcing insulating plug 43 extends, in the thickness direction of the wall, from one of the bearing zones 37 of the external rigid plate 19 until it is flush with the internal rigid plate 18 of the primary insulating panels 16. Each reinforcing insulating plug 43 is thus capable of taking up compressive forces acting in the area of the primary sealing membrane 6 opposite. In particular, as shown in FIG. 7, each reinforcing insulating plug 43 supports one of the bases 31, 32, 33, 34 of the node zone 26 facing the primary sealing membrane 6. Since the node zones 26 of the primary sealing membrane 6 are particularly sensitive to shocks and impacts resulting from movement of the fluid in the interior of the tank, it is critical for the bases 31, 32, 33, 34 of the node zone 26 to be supported on the primary thermally insulating barrier 5 in order to ensure satisfactory robustness of the primary thermal insulation barrier 5. Each reinforcing insulating plug 43 therefore has a structural function of taking up the compressive forces that might act on the node zone, in the thickness direction of the wall of the tank. As shown in FIG. 8, each reinforcing insulating plug may partially bear against the internal rigid plate and partially bear against the retention member 40 of the anchoring device 38.

To achieve this, each reinforcing insulating plug 43 comprises a polymer foam layer 45 which has a compressive yield strength at least equal to 80% of that of the polymer foam layer 17 of the primary insulating panels 16 and for example equal to or greater than the latter. To achieve this, according to a mode of embodiment, the polymer foam layer 45 of the reinforcing insulating plugs 43 has a density greater than that of the polymer foam layer 17 of the primary insulating panels 16 and preferably more than 1.2 times greater. By way of example, the polymer foam layer 45 of the reinforcing insulating plugs 43 has a density of between 180 and 240 kg/m$^3$, for example of the order of 210 kg/m$^3$. According to a mode of embodiment, the polymer foam layer 45 of the reinforcing insulating plugs 43 is made of polyurethane foam. Alternatively, the polymer foam layer is polyethylene foam or polyvinyl chloride foam.

In a manner which is complementary or alternative to a density of the polymer foam layer 45 greater than that of the primary insulating panels 16, the polymer foam layer 45 may be reinforced with fibers, for example by means of a mesh of glass fibers, which also contributes to increasing the compressive yield strength of the material. The fibers are preferably oriented in the thickness direction of the wall, which improves the compressive strength of the reinforcing insulating plugs 43 to an even greater extent.

Furthermore, in the mode of embodiment depicted, each reinforcing insulating plug 43 comprises an internal rigid plate 46, made of wood veneer, flush with the internal rigid plate 18 of the primary insulating panels 16. In an alternative variant which is not depicted, none of the reinforcing insulating plugs 43 comprises an internal rigid plate 46 and the polymer foam layer 45 of each of the reinforcing insulating plugs 43 is flush with the internal surface of the primary insulating panels 16.

The insulating block 44 is for example formed from a polymer foam. As shown in FIG. 7, the insulating block 44 does not support the bearing bases 31, 32, 33, 34 of the node zone 26. The polymer foam of the insulating block 44 may thus have a lower compressive yield strength, and consequently a lower density, than those of the polymer foam layer 45 of the reinforcing insulating plugs 43. According to a mode of embodiment, the insulating block 44 is thus made from polyurethane foam having a density of between 110 and 150 kg/m$^3$, for example of the order of 120 kg/m$^3$. The insulating block 44 is optionally reinforced with fibers, such as glass fibers. The insulating block 44 may also be made from polyethylene foam or polyvinyl chloride foam.

It will be noted that, advantageously, the reinforcing insulating plugs 43 are not bonded to the primary insulating panels 16 in such a way that all the forces pass compressively through said reinforcing insulating plugs 43.

Optionally, as shown in FIG. 6, a retaining device 47 is capable of ensuring that each of the reinforcing insulating plugs 43 is retained in a respective recess 36, prior to positioning of the insulating block 44 in the housing 39. The retaining device comprises four catches 48 which are each fixed onto one of the corners of the internal rigid plate 18 of one of the primary insulating panels 16. Each catch 48 comprises a portion 49 directed in the thickness direction of the wall, between one of the reinforcing insulating plugs 43 and the central zone of the housing 39, in such a way as to retain said reinforcing insulating plug 43 in the respective recess 36.

Figure 9:
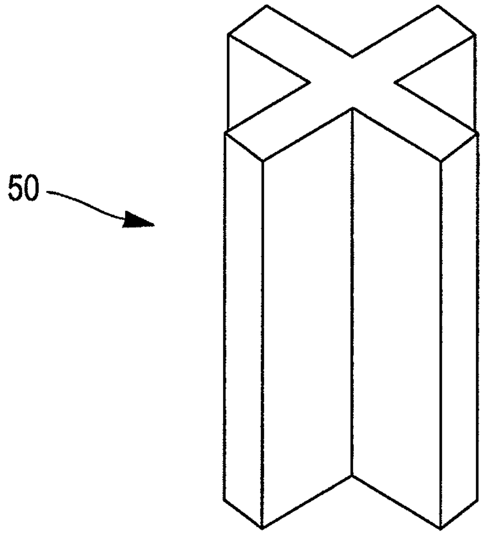
FIG. 9 is a schematic depiction of an insulating plug according to a variant embodiment.

FIG. 9 shows a reinforcing insulating plug 50 according to a variant embodiment. In this variant embodiment, the reinforcing insulating plug 50 has a shape which is complementary to that of the housing 39, in the shape of an X formed at the corners of four adjacent primary insulating panels 16. The same reinforcing insulating plug 50 thus makes it possible to support the four bearing bases 31, 32, 33, 34 of the node zone 26 and plug the four recesses 36 formed in the four adjacent corners of the primary insulating panels 16.

The reinforcing insulating plug 50 comprises a polymer foam layer having identical features to those of the reinforcing insulating plugs 43 described above. According to a variant embodiment, the reinforcing insulating plug 50 further comprises an internal rigid plate which is fixed on the polymer foam layer.

Reinforcing insulating plugs 43, 50 such as described previously are advantageously disposed in the anchoring zones at the corners of the primary insulating panels 16, only in the areas of the walls of the tank which are most subjected to shocks resulting from movement of the fluid in the interior of the tank.

Furthermore, such reinforcing insulating plugs 43, 50 may also be housed in the recesses 35 formed along each of the two longitudinal edges of the primary insulating panels 16. This is particularly advantageous when said recesses 35 are formed facing at least one base of a node zone 26 of the primary sealing membrane 6.

Furthermore, in other modes of embodiment which are not depicted, the recesses which form the bearing zones and in which the reinforcing insulating plugs 43, 50 are housed are formed neither on one of the edges of the primary insulating panel 16, nor at one of its corners, and pass through the polymer foam layer 17.

Furthermore, the recesses may have shapes different from those described above. In particular, the housing formed by the four recesses formed at the corners of the adjacent primary insulating panels does not necessarily have the shape of a cross and may equally have a cylindrical, polyhedral or other shape.

Furthermore, according to the invention, the specific zone of the primary sealing membrane 6 which lies against one of the reinforcing insulating plugs is not necessarily a node zone 26 of the primary sealing membrane 6 as in the modes of embodiment described above and may be formed by any zone of the primary sealing membrane comprising a zone projecting toward the interior of the tank, such as a single corrugation or the like. The specific zone of the primary sealing membrane may also be a zone projecting toward the exterior of the tank, such as a node zone of the primary sealing membrane at the junction between two corrugations of the primary sealing membrane which project toward the exterior of the tank.

Figure 10:
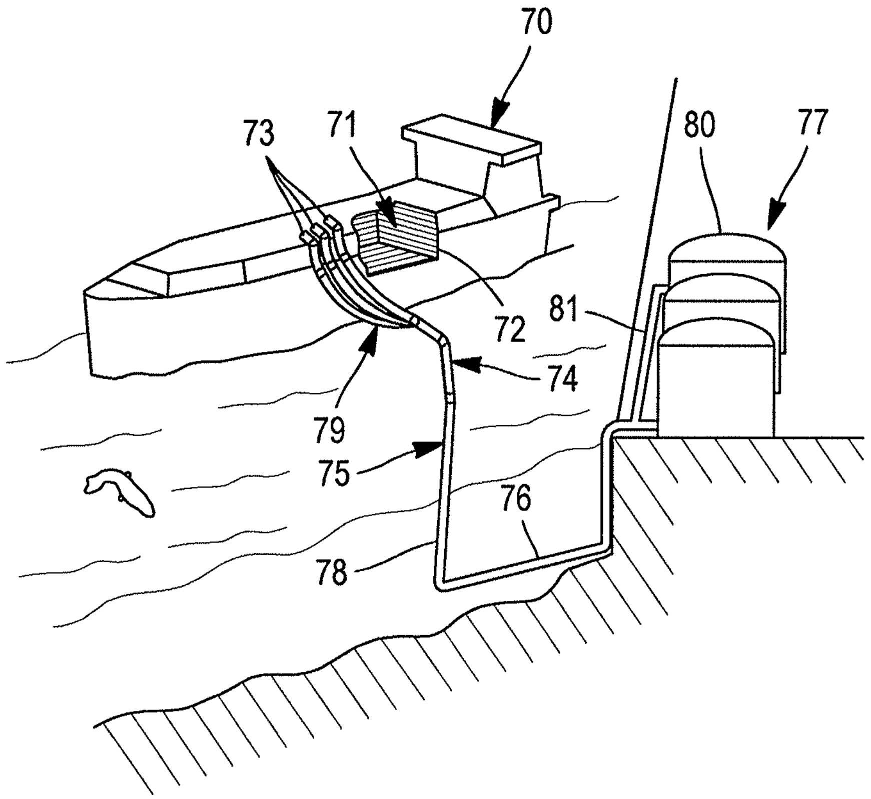
FIG. 10 is a schematic cutaway depiction of a tank of a methane tanker comprising walls such as shown in FIG. 1 and of a terminal for loading/offloading this tank.

Referring to FIG. 10, a cutaway view of a methane tanker 70 shows a sealed and insulated tank 71 having a generally prismatic shape mounted in the double hull 72 of the ship. The wall of the tank 71 comprises a primary sealing membrane intended to be in contact with the LNG contained in the tank, a secondary sealing membrane arranged between the primary sealing membrane and the double hull 72 of the ship, and two insulating barriers arranged respectively between the primary sealing membrane and the secondary sealing membrane and between the secondary sealing membrane and the double hull 72.

In a manner which is known per se, loading/offloading pipelines 73 disposed on the top deck of the ship may be connected, by means of suitable connectors, to a maritime or harbor terminal in order to transfer a cargo of LNG from or to the tank 71.

FIG. 10 depicts one example of a maritime terminal comprising a loading and offloading station 75, an underwater pipe 76 and an onshore facility 77. The loading and offloading station 75 is a fixed offshore facility comprising a mobile arm 74 and a tower 78 supporting the mobile arm 74. The mobile arm 74 carries a bundle of insulated flexible conduits 79 that can be connected to the loading/offloading pipelines 73. The orientable mobile arm 74 adapts to suit all sizes of methane tanker. A connecting pipe, not depicted, extends inside the tower 78. The loading and offloading station 75 allows the methane tanker 70 to be loaded and offloaded from or to the onshore facility 77. The latter comprises liquefied gas storage tanks 80 and connecting pipes 81 connected by the underwater pipe 76 to the loading or offloading station 75. The underwater pipe 76 allows the transfer of liquefied gas between the loading or offloading station 75 and the onshore facility 77 over a long distance, for example 5 km, making it possible to keep the methane tanker 70 a long way away from the shore during the loading and offloading operations.

In order to generate the pressure required for the transfer of the liquefied gas, use is made of pumps carried onboard the ship 70 and/or pumps with which the onshore facility 77 is equipped and/or pumps with which the loading and offloading station 75 is equipped.

Although the invention has been described in conjunction with a number of particular modes of embodiment, it is quite obvious that it is not in any way restricted thereto and that it comprises all the technical equivalents of the means described and combinations thereof where these fall within the scope of the invention.

The use of the verbs "comprise", "have" or "include" and conjugated forms thereof does not exclude there being elements or steps other than those listed in a claim.

In the claims, any reference sign between parentheses should not be interpreted as placing a limit on the claim.

The invention claimed is:

1. A sealed and thermally insulating tank for storing a fluid, the tank comprising:

a wall comprising, in a thickness direction from an exterior toward an interior of the tank,
- a supporting structure,
- a primary thermal insulation barrier, and
- a primary sealing membrane which lies against the primary thermal insulation barrier and is configured to be in contact with the fluid stored in the tank, the primary thermal insulation barrier comprising:
- a first primary insulating panel including an external rigid plate and a polymer foam layer which is fixed on the external rigid plate and is disposed between the external rigid plate and the primary sealing membrane, the first primary insulating panel comprising an internal rigid plate fixed to the polymer foam layer and disposed between the insulating polymer foam layer and the primary sealing membrane, the polymer foam layer having a recess which extends through a whole thickness of the polymer foam layer at a corner or at an edge of the first primary insulating panel, the recess forming, at the external rigid plate, a bearing zone, the bearing zone of the external rigid plate collaborating with an anchoring device bearing against the bearing zone of the external rigid plate to hold the external rigid plate toward the supporting structure, the internal rigid plate of the first primary insulating panel having a recess extending the recess of the polymer foam layer at the corner or the edge of the first primary insulating panel, and
- a second primary insulating panel, a corner or an edge of the second primary insulating panel being adjacent to the corner or the edge of the first primary insulating panel, the second primary insulating panel including
  - an external rigid plate, a polymer foam layer which is fixed on the external rigid plate of the second primary insulating panel and is disposed between the external rigid plate of the second primary insulating panel and the primary sealing membrane, and an internal rigid plate fixed to the polymer foam layer and disposed between the insulating polymer foam layer and the primary sealing membrane, the polymer foam layer of the second primary insulating panel having a recess which extends through the whole thickness of the polymer foam layer and is formed at the corner or the edge of said second primary insulating panel, the recess forming, at the external rigid plate of the second primary insulating panel, a bearing zone, the bearing zone of the external rigid plate collaborating with the anchoring device, wherein the anchoring device bears against the bearing zone of the external rigid plate to hold the external rigid plate of the second primary insulating panel toward the supporting structure, the internal rigid plate of the second primary insulating panel having a recess extending the recess of the polymer foam layer at the corner or the edge of the second primary insulating panel, the respective recesses of the first and second primary insulating panels being disposed to open one into the other, wherein the anchoring device holds the external rigid plates of the first and second primary insulating panels toward the supporting structure without exerting pressure on the polymer foam layers of the first and second primary insulating panels, the anchoring device comprising a stud fixed directly or indirectly to the supporting structure at the corner or at the edge of the first and second primary insulating panels, and a retention member fixed on the stud, the retention member of the anchoring device having a plurality of tabs bearing against each of the bearing zones, the primary sealing membrane comprising a specific zone which is disposed plumb with the bearing zones and which comprises a portion projecting toward the interior of the tank, the primary thermal insulation barrier comprising a first reinforcing insulating plug and respectively a second reinforcing insulating plug which is housed in the recesses of the first primary insulating panel and respectively the second primary insulating panel, said first reinforcing insulating plug and respectively the second reinforcing insulating plug extending, in the thickness direction, from the bearing zone of the external rigid plate to the specific zone of the primary sealing membrane, the first reinforcing insulating plug and respectively the second reinforcing insulating plug bearing against the external rigid plate and against the specific zone of the primary sealing membrane to take up compressive forces that act on the specific zone of the primary sealing membrane, the first reinforcing insulating plug and respectively the second reinforcing insulating plug partially directly bearing against the external rigid plate of the first primary insulating panel and respectively the second primary insulating panel, a first one of the tabs of the retention member being disposed between the bearing zone of the external rigid plate of the first primary insulating panel and the first reinforcing insulating plug, a second one of the tabs of the retention member being disposed between the bearing zone of the external rigid plate of the second primary insulating panel and the second reinforcing insulating plug, the first reinforcing insulating plug and respectively the second reinforcing insulating plug being flush with the internal rigid plate of the first primary insulating panel and respectively the second primary insulating panel, the first reinforcing insulating plug and respectively the second reinforcing insulating plug comprising a polymer foam layer having a compressive yield strength equal to or greater than 80% of a compressive yield strength of the polymer foam layer of the first primary insulating panel and respectively the second primary insulating panel, wherein the first reinforcing insulating plug is not attached to the first primary insulating panel, and wherein the second reinforcing insulating plug is not attached to the second primary insulating panel.

2. The tank as claimed in claim 1, wherein the primary sealing membrane is a corrugated membrane comprising at least two corrugations projecting toward the interior of the tank which intersect at the specific zone.

3. The tank as claimed in claim 1, wherein the polymer foam layer of the first reinforcing insulating plug has a density equal to or greater than the density of the polymer foam layer of the first primary insulating panel.

4. The tank as claimed in claim 3, wherein the density of the polymer foam layer of the first reinforcing insulating plug is more than 1.2 times greater than the density of the polymer foam layer of the first primary insulating panel.

5. The tank as claimed in claim 1, wherein the polymer foam layer of the first primary insulating panel has a density of between 110 and 150 kg/m$^3$.

6. The tank as claimed in claim 1, wherein the polymer foam layer of the first reinforcing insulating plug has a density of between 180 and 240 kg/m$^3$.

7. The tank as claimed in claim 1, wherein the primary thermal insulation barrier further comprises a third primary insulating panel and a fourth primary insulating panel, each of the third primary insulating panel and the fourth primary insulating panel comprising a corner adjacent to the corner of the first primary insulating panel and respectively the second primary insulating panel, each of the third primary insulating panel and the fourth primary insulating panel including an external rigid plate and a polymer foam layer which is fixed on the external rigid plate of one of the third primary insulating panel and the fourth primary insulating panel and is disposed between the external rigid plate and the primary sealing membrane, the polymer foam layer of each of the third primary insulating panel and the fourth primary insulating panel having a recess which extends through the whole thickness of said polymer foam layer at said corner such that the external rigid plate of each of the third primary insulating panel and the fourth primary insulating panel has a bearing zone, the respective recesses of the first, second, third, and fourth primary insulating panels being disposed to open one into the others and to form a housing, the anchoring device being disposed in the housing and being configured to hold the bearing zone of the external rigid plate of each of the first, second, third, and fourth primary insulating panels toward the supporting structure.

8. The tank as claimed in claim 7, wherein the primary thermal insulation barrier comprises a third reinforcing insulating plug and a fourth reinforcing insulating plug which are respectively housed in the recesses of t the third primary insulating panel and the fourth primary insulating panel and an insulating block which is disposed in the center of the housing between the first, second, third, and fourth reinforcing insulating plugs to maintain the third reinforcing insulating plug and the fourth reinforcing insulating plug in position, each of the third reinforcing insulating plug and the fourth reinforcing insulating plug extending, in the thickness direction, from the bearing zone of the external rigid plate of one of the third primary insulating panel and the fourth primary insulating panel to the specific zone of the primary sealing membrane, each of the third reinforcing insulating plug and the fourth reinforcing insulating plug bearing against the external rigid plate and against the specific zone of the primary sealing membrane, each of the third reinforcing insulating plug and the fourth reinforcing insulating plug comprising a polymer foam layer having a compressive yield strength greater than the compressive yield strength of the polymer foam layer of the third primary insulating panel and the fourth primary insulating panel.

9. The tank as claimed in claim 7, wherein the first reinforcing insulating plug has a shape which is complementary to the shape of the housing.

10. The tank as claimed in claim 1, wherein the first reinforcing insulating plug comprises an internal rigid plate flush with the internal rigid plate of the first primary insulating panel.

11. The tank as claimed in claim 1, further including a secondary thermal insulation barrier lying against the supporting structure and a secondary sealing membrane lying against the secondary thermal insulation barrier, the primary thermal insulation barrier lying against the secondary sealing membrane.

12. The tank as claimed in claim 11, wherein the secondary thermal insulation barrier comprises a secondary insulating panel anchored to the supporting structure, the anchoring device being fixed on the secondary insulating panel and thus ensuring anchoring of the first primary insulating panel on the secondary insulating panel.

13. A ship for transporting the fluid, the ship comprising:
- a hull; and
- the tank as claimed in claim 1 disposed in the hull.

14. A method for loading or offloading the ship as claimed in claim 13, wherein the fluid is conveyed through insulated pipelines from or to a floating or onshore storage facility to or from the tank of the ship.

15. A system for transferring the fluid, the system comprising:
- the ship as claimed in claim 13;
- a plurality of insulated pipelines configured to connect the tank installed in the hull of the ship to a floating or onshore storage facility; and
- a pump configured to cause a fluid to flow through the insulated pipelines from or to the floating or onshore storage facility to or from the tank of the ship.

16. The tank as claimed in claim 2, wherein the polymer foam layer of the first reinforcing insulating plug has a density equal to or greater than the density of the polymer foam layer of the first primary insulating panel.

17. The tank as claimed in claim 2, wherein the polymer foam layer of the first primary insulating panel has a density of between 110 and 150 $kg/m^3$.

18. The tank as claimed in claim 3, wherein the polymer foam layer of the first primary insulating panel has a density of between 110 and 150 $kg/m^3$.

19. The tank as claimed in claim 1, wherein the first reinforcing insulating plug partially indirectly bears against the external rigid plate by directly bearing against the retention member of the anchoring device.

* * * * *